United States Patent [19]

Miyazaki

[11] Patent Number: 5,184,172
[45] Date of Patent: Feb. 2, 1993

[54] METHOD OF AND APPARATUS FOR AUTOMATICALLY CONTROLLING EXPOSURE

[75] Inventor: Akihiko Miyazaki, Tokyo, Japan

[73] Assignee: U. S. Philips Corporation, New York, N.Y.

[21] Appl. No.: 771,386

[22] Filed: Oct. 2, 1991

[30] Foreign Application Priority Data

Nov. 28, 1990 [JP] Japan ................................. 2-327413

[51] Int. Cl.$^5$ .................... G03B 7/08; G03B 7/095; H04N 5/238; G01J 1/42
[52] U.S. Cl. ................................ 354/432; 354/446; 358/228; 356/222; 250/214 P; 250/208.1
[58] Field of Search ............... 354/429, 431, 432, 446; 356/222; 358/228; 250/214 P, 208.1, 208.2, 208.3

[56] References Cited

U.S. PATENT DOCUMENTS

| | | | |
|---|---|---|---|
| 4,364,650 | 12/1982 | Terashita et al. | 354/432 |
| 4,445,778 | 5/1984 | Nakauchi | 356/222 |
| 4,534,639 | 8/1985 | Konishi et al. | 354/432 |
| 4,855,780 | 8/1989 | Hayakawa | 354/432 |
| 4,912,495 | 3/1990 | Ishikawa | 354/432 X |
| 4,929,824 | 5/1990 | Miyazaki | 354/432 X |
| 4,978,990 | 12/1990 | Yamasaki et al. | 354/432 |

*Primary Examiner*—W. B. Perkey
*Attorney, Agent, or Firm*—Edward W. Goodman

[57] ABSTRACT

In an automatic exposure (AE) controlling method and apparatus according to the invention, a picturing area or a view is divided into a plurality of zones of which the central one is usually used for iris adjustment with the largest weight. The central zone is automatically expanded or reduced in the upper, lower, right-hand or left-hand direction(s) in accordance with differences in average luminance between the central zone and a respective one of the surrounding zones.

8 Claims, 4 Drawing Sheets

METHOD OF AND APPARATUS FOR AUTOMATICALLY CONTROLLING EXPOSURE

BACKGROUND OF THE INVENTION

1. Field of the Invention

The present invention relates to an automatic exposure controlling method suitable for use in a camera device such as a video camera and also to an apparatus for implementing such a method.

2. Description of the Related Art

There has been known an automatic exposure control apparatus in which the luminance of a subject is measured with the largest weight being applied to a luminance measuring zone disposed at the central part of a picturing area and in which the opening of an iris is controlled so that the measured luminance is kept at a predetermined level. Such kind of apparatus is disadvantageous in that the subject is rendered excessively dark when a strong light (for example, the sun light) from other parts than the subject enters the luminance measuring zone and that the exposure becomes excessive when a dark background exists in the above zone.

In order to obviate the above disadvantages, there have been proposed an apparatus (such as that disclosed in Japanese Patent Application No. 1-120178) in which the luminance measuring zone follows the subject and an apparatus (such as that disclosed in Japanese Patent Application No. 1-120179) in which the size of the luminance measuring zone is increased or decreased in several steps in accordance with the size of the subject. With the structure of such apparatuses, however, it has been difficult to bring the size and position of the luminance measuring zone accurately into agreement with a subject which has a unique shape. When an apparatus is constructed to meet such a requirement, its structure then becomes significantly complicated.

SUMMARY OF THE INVENTION

It is therefore an object of the invention to provide a method of automatically controlling an exposure wherein an appropriate exposure condition can be obtained in accordance with the brightness of a subject regardless of the shape of the subject or of the size or position of the subject within the picturing area.

It is another object of the invention to provide an apparatus in which such a method is used.

It is further object of the invention to provide an apparatus which has the above features but has a relatively simple structure.

An automatic exposure controlling method according to the present invention is characterized by dividing the picturing area into a specific zone and a plurality of zones adjacent to said specific zone; calculating an average luminance of each image in said specific and adjacent zones; with respect to each combination of said specific zone with a respective one of said plurality of zones, calculating a difference in average luminance between the two zones, moving a boundary between the specific zone and the adjacent zone towards this adjacent zone when said difference is not greater than a specific value, and moving said boundary away from said adjacent zone when said difference is greater than said specific value; and applying a maximum weight to the average luminance in said specific zone and controlling the iris based principally on this weighted average luminance.

With this method, the position of the above specific zone follows a subject within the picturing area and the shape of the zone is also rendered very similar to that of the subject. It is therefore possible to carry out an accurate exposure control in response to the luminance of a subject.

In the above method, it may be preferable to change a weight applied to the specific zone in accordance with the area size thereof. This makes it possible to carry out an accurate exposure control regardless of the size of a subject within the picturing area.

An automatic exposure control apparatus according to the invention is characterized by comprising storage means for storing coordinates each of which defines a boundary between a specific zone and a respective one of plural zones adjacent to said specific zone in the picturing area; calculating means for calculating an average luminance of an image in each zone based on information representative of luminance of a picture in the picturing area and said coordinates; changing means, with respect to each combination of said specific zone with a respective one of said plural zones, for calculating a difference in average luminance between the specific zone and the adjacent zone to change the corresponding coordinate so that the boundary between the specific zone and the adjacent zone moves towards this adjacent zone when said difference is not greater than a specific value and to change said corresponding coordinate so that said boundary moves away from said adjacent zone when said difference is greater than said specific value; applying means for applying a maximum weight to that part of said information representative of the luminance of the picture within said picturing area which corresponds to said specific zone based on said coordinates; and control means for controlling opening of the iris in accordance with an output from said weight applying means.

With an apparatus having the above structure, it is not only possible to cause the position of the specific zone to follow a subject but also possible to render the shape thereof similar to that of the subject only by changing the coordinates in accordance with the results of comparison of the differences between the average luminance values of the respective zones. It is thus possible to carry out a very accurate exposure control with a relatively simple construction.

The apparatus of the above structure may further be provided with means for outputting a signal corresponding to an area size of the specific zone in accordance with the coordinates so that the control means control the opening of an iris in response to an output of the weight applying means and the signal corresponding to the area size. With this structure, an accurate exposure control can be achieved regardless of the size of a subject within the picturing area.

DESCRIPTION OF THE PREFERRED EMBODIMENT

First of all, the principle of the automatic exposure controlling method according to the invention will be described.

Figure 1:
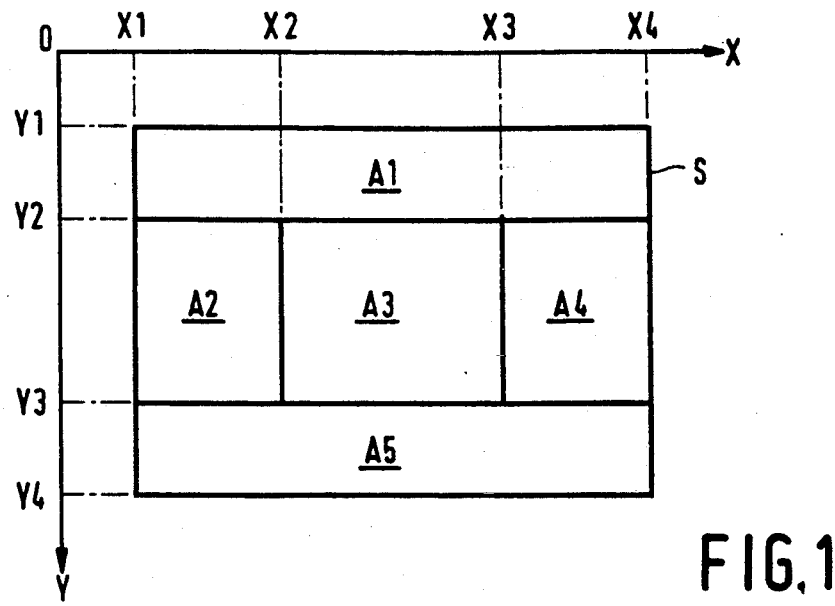
FIGS. 1 to 3 are illustrations showing the principle of the automatic exposure controlling method according to the invention.

FIG. 1 shows a picturing area S in this automatic exposure controlling method. In this method, the picturing area S is divided, for example, into five sub-areas A1, A2, A3, A4 and A5 wherein the central sub-area A3 is a luminance measuring zone which is given a larger weight than the other sub-areas. With respect to each of these five sub-areas A1 to A5, an average luminance of the image is obtained. Then, a difference between the average luminance of the above central sub-area A3 and that of a respective one of the sub-areas A1, A2, A4 and A5 adjacent to the sub-area A3 is obtained. If the difference in average luminance is less than a predetermined value the central sub-area A3 is expanded towards the relevant adjacent sub-area, and if the difference in average luminance exceeds the predetermined value, the central sub-area A3 is reduced on the side of the relevant adjacent sub-area.

Figure 2:
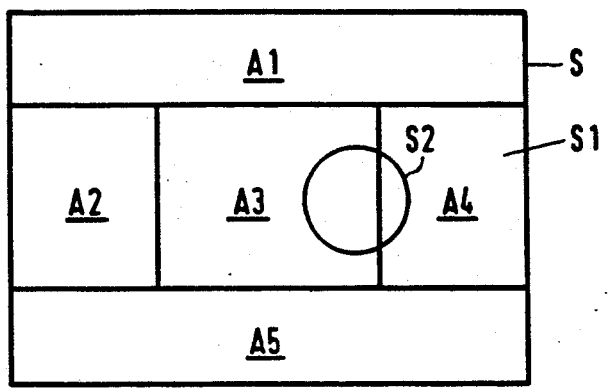
Figure 3:
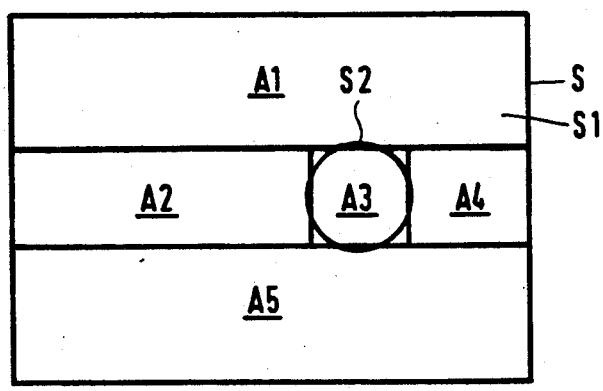

For example, as shown in FIG. 2, when it is assumed that a picture within the picturing area S has a bright subject S2 on a dark background S1 and that the subject S2 bestrides over the sub-areas A3 and A4, the average luminance values of the areas A3 and A4 are both high and those of the areas A1, A2 and A5 are similar and low. Therefore, the central sub-area A3 is expanded on the side of the sub-area A4 and is reduced on the sides of the sub-areas A1, A2 and A5, which results in the state shown in FIG. 3.

When the central sub-area A3 is changed as described above, this sub-area follows a target subject, so that a bright or a dark background which is different in luminance from the subject is excluded from this sub-area A3. Therefore, if the iris is controlled in accordance with the luminance in the thus obtained central sub-area A3, an exposure state suitable for shooting the subject S2 can be obtained.

An embodiment of the invention will now be described with reference to the drawings.

Figure 4:
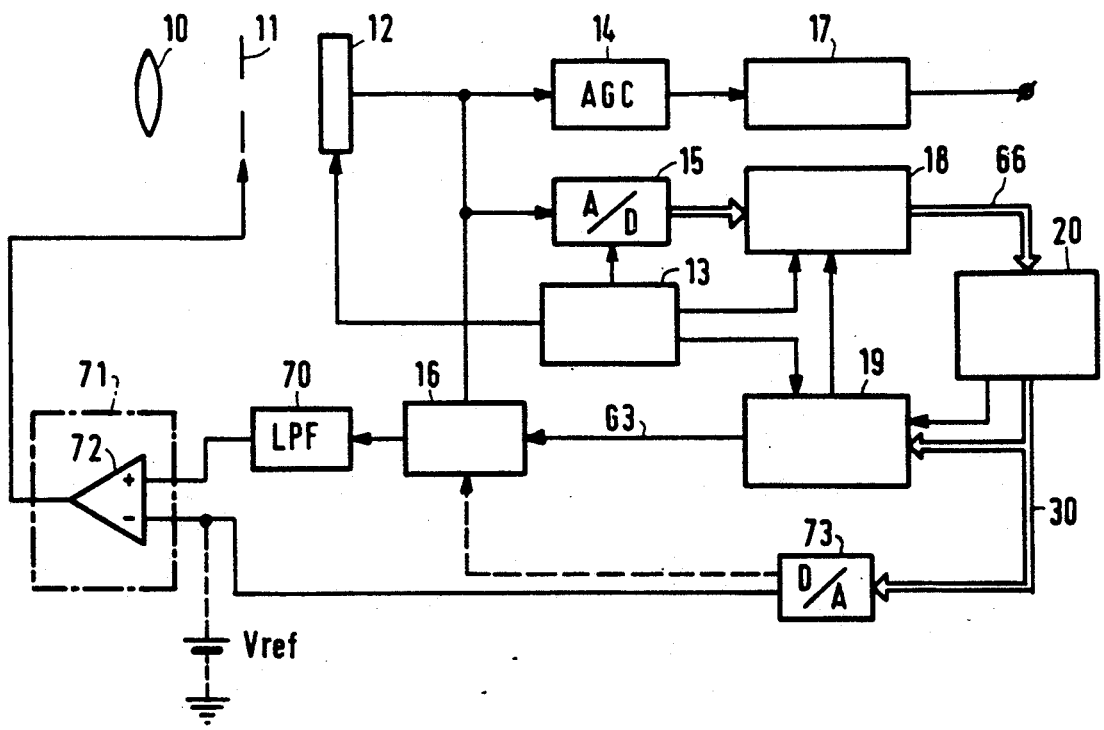
FIG. 4 is a block diagram of an embodiment of the invention wherein the automatic exposure control apparatus is applied to a video camera.

FIG. 4 shows the structure of an embodiment of the automatic exposure control apparatus which is applied to a video camera. In FIG. 4, optical picture information received via a camera lens 10 passes through an iris 11 and reaches an image sensor 12 which is constructed comprising a CCD. This image sensor 12 converts the optical picture information into an electric picture signal corresponding thereto in response to a timing signal fed from a timing generator circuit 13 in the known scanning manner. This picture signal is supplied to an automatic gain control circuit (AGC circuit) 14, an analog-to-digital converter (A/D converter) 15 and a weighting circuit 16.

The AGC circuit 14 amplifies the picture signal so that an output of a constant amplitude is obtained and supplies the amplified signal to a picture signal processing circuit 17. This picture signal processing circuit 17 performs a predetermined processing on the received picture signal and then supplies the processed signal to relevant portions of this video camera such as a video signal encoder (not shown).

The A/D converter 15 samples the luminance component of the picture signal fed from the image sensor 12, for example, at a frequency $64f_H$ sixty-four times as high as the horizontal scanning frequency based on an output of the timing generator circuit 13 and converts each sample into a digital value. The thus obtained digital luminance values are supplied in succession to an accumulator circuit 18. This accumulator circuit 18 accumulates the digital luminance values with regard to each of the sub-areas A1 to A5, for example, for each field period in accordance with an output of a gating signal generating circuit 19 which will be described later. The respective accumulated values thus obtained are supplied to a processor 20 which is constituted, for example, by a microcomputer or the like. In this processor 20, programs for carrying out calculations and various controls including the control of the gating signal generating circuit 19, addresses on the picturing area and the like have previously been stored.

The gating signal generating circuit 19 generates a gating signal G1 corresponding to the scanning period of the sub-area A1, a gating signal G2 corresponding to the scanning period of the sub-area A2, a gating signal G3 corresponding to the scanning period of the sub-area A3, a gating signal G4 corresponding to the scanning period of the sub-area A4, a gating signal G5 corresponding to the scanning period of the sub-area A5 and other necessary timing signals. This circuit may be constructed as shown in FIG. 5.

Figure 5:
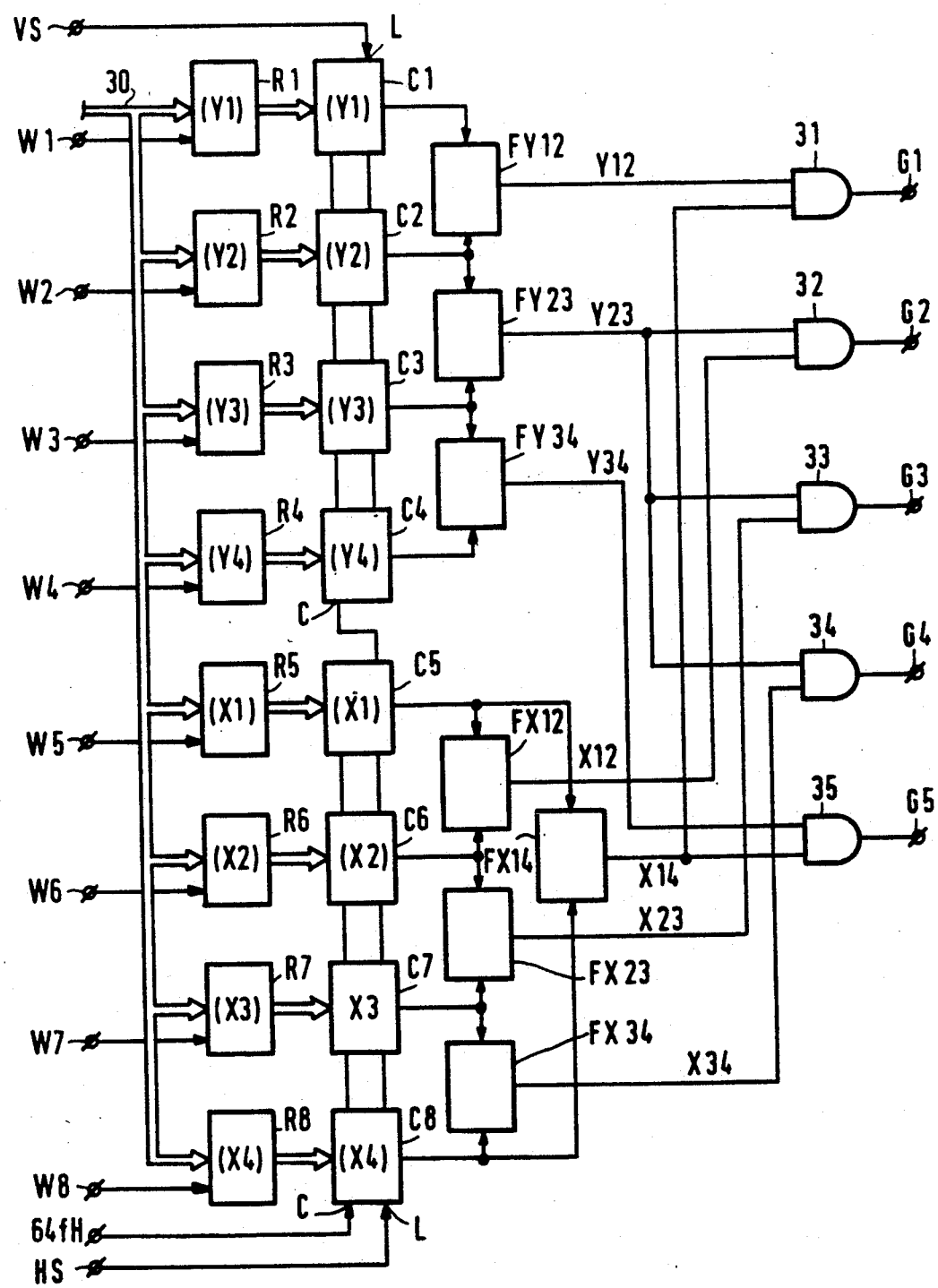
FIG. 5 is a circuit diagram of the gating signal generating circuit 19 of the embodiment of FIG. 4.

In FIG. 5, an output bus 30 of the aforesaid processor 20 is connected to eight registers R1 to R8. The registers R1, R2, R3 and R4 are loaded by the processor 20 with addresses Y1 (representing the upper end of the sub-area A1, see FIG. 1), Y2 (the lower end of the sub-area A1), Y3 (the upper end of the sub-area A5) and Y4 (the lower end of the sub-area A5) on the picturing area S each in the form of two's complement in response respectively to signals W1, W2, W3 and W4 supplied from the processor. Similarly, the registers R5, R6, R7 and R8 are loaded with addresses X1 (the left-hand end of the sub-area A2), X2 (the right-hand end of the sub-area A2), X3 (the left-hand end of the sub-area A4) and X4 (the right-hand end of the sub-area A4) on the area S each in the form of two's complement. Output terminals of these registers R1 to R8 are connected to data input terminals of counters C1 to C8, respectively.

Load terminals L of the counters C1 to C4 are supplied by the timing signal generator circuit 13 with a vertical synchronization signal VS. When the signal VS is generated, the addresses Y1 to Y4 in the registers R1 to R4 are loaded into the counters C1 to C4, respectively. Clock terminals C of the counters C1 to C4 are supplied by the timing signal generator circuit 13 with a horizontal synchronization signal HS. Each time the signal HS is generated, the contents of the counters C1 to C4 are incremented. A carry output terminal of the counter C1 is connected to a set terminal of a flip-flop FY12, and a carry output terminal of the counter C2 is connected to a reset terminal of the same flip-flop. Thus, this flip-flop FY12 is brought into a set state when the counter C1 outputs a carry and is brought into a reset state when the counter C2 outputs a carry. Similarly, flip-flops FY23 and FY34 are brought into set states respectively by carries from the counters C2 and C3 and brought into reset states respectively by carries from the counters C3 and C4.

The counters C5 to C8 are supplied at their load terminals L with the horizontal synchronization signal HS. When this signal HS is generated, the addresses X1 to X4 in the registers R5 to R8 are loaded into the counters C5 to C8, respectively. The counters C5 to C8 are also supplied at their clock terminals C with the timing signal $64f_H$. Each time this signal $64f_H$ is generated, the contents of these counters are incremented. Flip-flops FX12, FX23, FX34 and FX14 are brought into set states respectively by carry outputs of the counters C5, C6, C7 and C5 and are brought into reset states respectively by carry outputs of the counters C6, C7, C8 and C8 in a manner described above for the flip-flops FY12 to FY34.

An output signal Y12 of the flip-flop FY12 is supplied to one input terminal of an AND gate 31, to the other input terminal of which an output signal X14 of the flip-flop FX14 is supplied. Thus, this AND gate 31 outputs a gating signal G1 which becomes true during the time when the sub-area A1 is scanned. An output signal Y23 of the flip-flop FY23 is supplied to one input terminals of AND gates 32 to 34. The other input terminal of the AND gate 32 is supplied with an output X12 of the flip-flop FX12, so that this AND gate outputs a gating signal G2 which becomes true during the time when the sub-area A2 is scanned. Also, the other input terminal of the AND gate 33 is supplied with an output X23 of the flip-flop FX23, so that this AND gate outputs a gating signal G3 which becomes true during the time when the sub-area A3 is scanned. In the similar manner, an AND gate 34 produces from the signal signal Y23 and an output signal X34 of the flip-flop FX34 a gating signal G4 which becomes true during the scanning period of the sub-area A4, and an AND gate 35 produces from the signal X14 and an output signal Y34 of the flip-flop FY34 a gating signal G5 which becomes true during the scanning period of the sub-area A5. The gating signals G1 to G5 are supplied to the accumulator circuit 18 shown in FIG. 4. This accumulator circuit 18 may be constructed as shown in FIG. 6.

Figure 6:
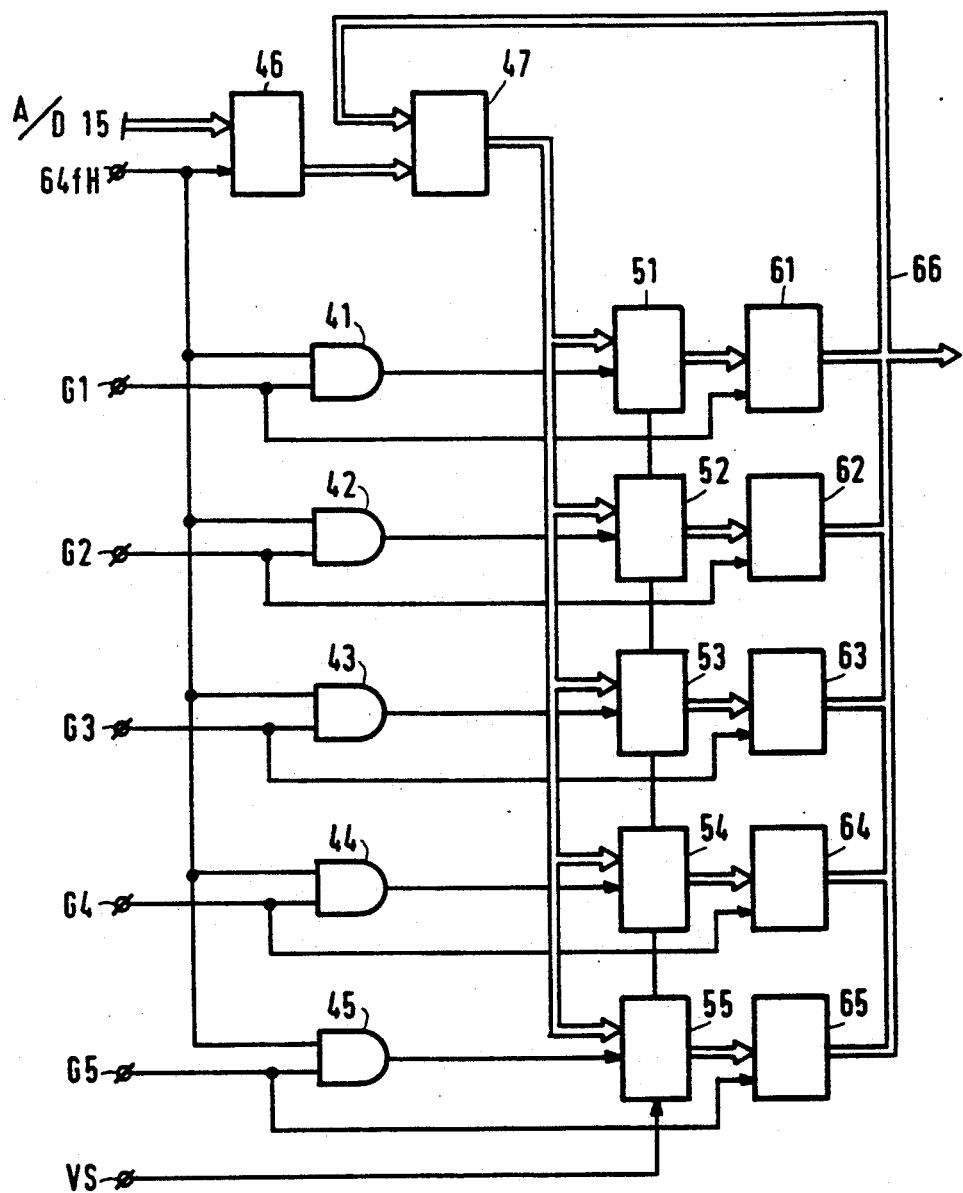
FIG. 6 is a circuit diagram of the accumulator circuit 18 of the embodiment of FIG. 4.

In FIG. 6, the gating signals G1 to G5 are supplied one input terminals of AND gates 41 to 45, respectively. The other input terminals of these AND gates are supplied with the timing signal $64f_H$, so that each AND gate outputs the timing signal $64f_H$ only when a respective one of the sub-areas A1 to A5 is scanned. On the other hand, the digital luminance values (the sample values) sequentially outputted from the A/D converter 15 shown in FIG. 4 are supplied to a data input terminal of a latch circuit 46 and are loaded in succession into this latch circuit in response to the timing signal $64f_H$. The digital luminance value outputted from the latch circuit 46 is supplied to one input terminal of an adder 47 and is added in this adder to a value fed to the other input terminal thereof, the addition result being supplied to respective data input terminals of latch circuits 51 to 55. Clock input terminals of these latch circuits 51 to 55 are supplied with output signals of the AND gates 41 to 45, respectively. Therefore, each of the latch circuits 51 to 55 latches the output values of the adder 47 and supplies them to a respective one of buffer amplifiers 61 to 65 in the subsequent stage only when a relevant one of the sub-areas A1 to A5 is scanned. Each of the buffer amplifiers 61 to 65 supplies an output of a corresponding one of the latch circuits 51 to 55 to the other input terminal of the adder 47 only when a respective one of the gating signals G1 to G5 is true. The latch circuits 51 to 55 are supplied at their clear terminals with the vertical synchronization signal VS.

With the accumulator circuit 18 having the above structure, the latch circuits 51 to 55 are first cleared by the vertical synchronization signal VS and thereafter the digital luminance values received from the A/D converter 15 are successively supplied to the adder 47 at the time interval of the signal $64f_H$. When the sub-area A1 shown in FIG. 1 is scanned, for example, the signal G1 is true, so that the output of the adder 47 is fed back to the other data input terminal of this adder through the latch circuit 51 and the buffer amplifier 61, whereby an accumulator circuit is formed. In this manner, an accumulated value of the digital luminance values produced during the scanning period of the sub-area A1 is obtained at the latch circuit 51. Similarly, accumulated values of the digital luminance values produced during the respective scanning periods of the sub-areas A2, A3, A4 and A5 are obtained at the latch circuits 52, 53, 54 and 55, respectively.

After the accumulations of the digital luminance values have thus been performed, the processor 20 shown in FIG. 4 sequentially enables the buffer amplifiers 61 to 65 by a not-shown timing signal so that the respective accumulated values contained in the latch circuits 51 to 55 are read out through an input bus 66 and are stored.

Referring again to FIG. 4, the gating signal G3 generated by the gating signal generating circuit 19 is further supplied to the weighting circuit 16. This weighting circuit is of the conventional structure and supplies, over the time period when the gating signal G3 is generated, the luminance component of the picture signal from the image sensor 12 to a low-pass filter 70 after applying a predetermined weight to this luminance component. The low-pass filter 70 smoothes the received signal and supplies it to a non-inverting input terminal of an operational amplifier 72 provided in an iris control circuit 71. The operational amplifier performs a control in such a way that the opening of the iris 11 changes in the closing sense when the output voltage of this amplifier increases and changes in the opening sense when the output voltage decreases.

The processor 20 reads the accumulated digital luminance values in the respective sub-areas from the accumulator circuit 18 each time the scanning, for example, of each field of the taken picture ends. The processor 20 also calculates area sizes of the sub-areas based on the addresses Y1 to Y4 and X1 to X4 which define these sub-areas. The processor 20 then obtain the average luminance values L(1) to L(5) in the sub-areas A1 to A5 by dividing the accumulated luminance values by the relevant area sizes, respectively. The processor 20 further determines the maximum value L(max) and the minimum value L(min) of the average luminance values L(1) to L(5) and also calculates an average value L(mean) of these average luminance values.

Thus, the processor 20 determines the following relation between the average luminance L(3) of the sub-area A3 disposed centrally of the picture area S and those of the sub-areas A1, A2, A4 and A5 adjoining this central sub-area:

$$|L(i)-L(3)| \times C_1 <= L(max)-L(min) \tag{1}$$

where i is an integer of 1, 2, 4 or 5, $C_1$ being a predetermined constant. The processor 20 then carries out further processing. More specifically, when the above formula (1) is established the relevant one of the addresses X1 to X4 and Y1 to Y4 are changed to move the boundary between the central sub-area A3 and the sub-area Ai towards the sub-area Ai. When the above formula (1) is not established, the boundary is moved away from the sub-area Ai. For example, when the formula (1) is established with regard to the combination of the sub-areas A3 and A4, the address X3 disposed on the boundary between the sub-areas A3 and A4 is increased to thereby move the boundary towards the sub-area A4, that is to say, in the right-hand direction. When the formula (1) is not established with regard to the combination of the sub-areas A2 and A3, the address X2 is increased to move the boundary between these sub-areas away from the sub-area A2, that is to say, in the right-hand direction. The same is true of the other sub-areas.

Thus, the central sub-area A3 is expanded on the side of that adjacent sub-area whose difference in average luminance from the sub-area A3 is small and is decreased on the side of that adjacent sub-area whose difference in average luminance is large.

When the following relation is established with regard to the values L(max), L(min) and L(mean), the addresses X2 and Y2 are reduced with the addresses X3 and Y3 being increased so that the central sub-area A3 is expanded in all of the upper, lower, right-hand and left-hand directions:

$$[L(max) - L(min)] \times C_2 < = L(mean) \qquad (2)$$

where $C_2$ is a predetermined constant. In other words, if there is no much difference in average luminance among the sub-areas A1 to A5, the central sub-area A3 is expanded in all the directions.

In parallel with the above-described processing, the processor 20 outputs to a D/A converter 73 a value which is correspondent to (for example, in proportion to) the area size of the central sub-area A3. The D/A converter 73 in turn converts the above value into an analog signal which is supplied to an inverting input terminal of the operational amplifier 72 as a reference signal.

Thus, in this embodiment the reference signal to be compared at the iris control circuit 71 with the output from the low-pass filter 70 is varied in accordance with the area size of the central sub-area A3, that is to say, in accordance with the size of a subject in the picturing area. The reason for this is as follows. The output value of the low-pass filter 70 is high when a subject has a large area and low when a subject has a small area even if the subjects have the same luminance. Therefore, if the value of the reference signal to be compared with this output is changed in accordance with the area size of a subject, substantially the same opening of the iris can be obtained with regard to subjects having the same luminance irrespectively of area sizes thereof.

Figure 7:
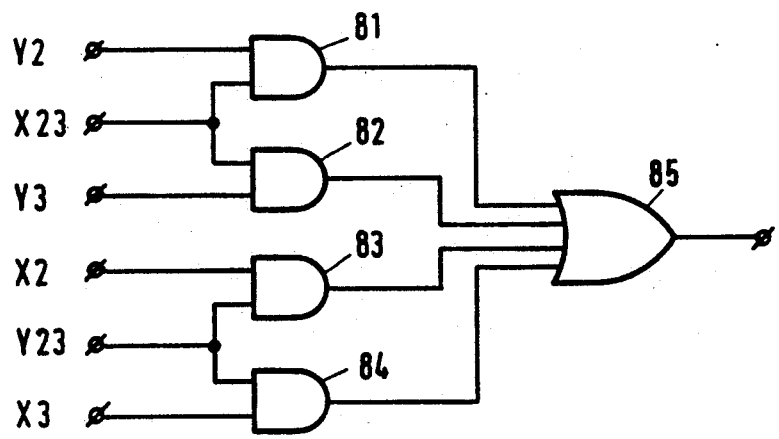
FIG. 7 is a circuit diagram of an exemplary circuit which displays a window frame of the central sub-area A3 of the embodiment of FIG. 4.

If it is desired to determine where the sub-area A3 is located in the picturing area S, an output of a circuit shown, for example, in FIG. 7 may selectively be mixed through a switch element or the like with the video signal which is supplied to an electronic viewfinder (not shown) of this video camera so that the boundary of the sub-area A3 is displayed on a screen of the viewfinder in the form of a window frame.

The circuit shown in FIG. 7 is constructed comprising an AND gate 81 which receives the signals Y2 and X23 from the gating signal generating circuit 19 and an AND gate 82 which receives the signals Y3 and X23. This circuit further comprises an AND gate 83 which receives the signals X2 and Y23, an AND gate 84 which receives the signals X3 and Y23 and an OR gate which receives outputs from the above four AND gates.

In the above-described embodiment, the picturing area S is divided as shown in FIG. 1. However, the way of dividing the picturing area should not be restricted only to this, but it will be apparent that the division may alternatively be performed in such a way that the picturing area is rotated by ninety degrees in FIG. 1 or in other ways. Also, the way of determination about the difference in average luminance between the central sub-area and the adjacent sub-areas should not be restricted only to those represented by the above formulas (1) and (2) and other determination methods may be employed.

Also, the way of changing the weight in accordance with the area size of the central sub-area A3 should not also be restricted only to that shown in FIG. 4. Alternatively, an output signal of the D/A converter 73 may be supplied to the weighting circuit 16 as indicated by a broken line in FIG. 4. In this case, the weighting circuit 16 should be constructed such that the weight to be applied therein is changed in response to the above signal, and the inverting input terminal of the operational amplifier 72 should be supplied with a fixed reference voltage $V_{ref}$.

When it is desired to restrict the range of movement of the central sub-area A3 to within a predetermined zone in the picturing area S, the minimum values of the addresses X2 and Y2 and the maximum values of the addresses X3 and Y3 may be set to desired values, respectively.

I claim:

1. A method of automatically controlling opening of an iris based principally on luminance of an image in a specific zone within a picturing area characterized by the steps of:
   dividing the picturing area into a specific zone and a plurality of zones adjacent to said specific zone;
   calculating an average luminance of each image in said specific and adjacent zones;
   with respect to each combination of said specific zone with a respective one of said plurality of zones, calculating a difference in average luminance between the two zones, moving a boundary between the specific zone and the adjacent zone towards this adjacent zone when said difference is not greater than a specific value, and moving said boundary away from said adjacent zone when said difference is greater than said specific value; and
   applying a maximum weight to the average luminance in said specific zone and controlling the iris based principally on this weighted average luminance.

2. A method as claimed in claim 1, characterized in that said specific zone is expanded towards all of said plurality of adjacent zones when a difference between the maximum and the minimum ones of the average luminance values of said specific and adjacent zones is less than a specific value.

3. A method as claimed in claim 1, characterized in that said maximum weight is varied in accordance with an area size of said specific zone.

4. An apparatus for automatically controlling opening of an iris based principally on luminance of an image in a specific zone within a picturing area characterized in that said apparatus comprises:
   storage means for storing coordinates each of which defines a boundary between a specific zone and a respective one of plural zones adjacent to said specific zone in the picturing area;

calculating means for calculating an average luminance of an image in each zone based on information representative of luminance of a picture in the picturing area and said coordinates;

changing means, with respect to each combination of said specific zone with a respective one of said plural zones, for calculating a difference in average luminance between the specific zone and the adjacent zone to change the corresponding coordinate so that the boundary between the specific zone and the adjacent zone moves towards this adjacent zone when said difference is not greater than a specific value and to change said corresponding coordinate so that said boundary moves away from said adjacent zone when said difference is greater than said specific value;

applying means for applying, based on said coordinates, a maximum weight to that part of said information representative of the luminance of the picture within said picturing area which corresponds to said specific zone; and control means for controlling opening of the iris in accordance with an output from said weight applying means.

5. An apparatus as claimed in claim 4, characterized in that said apparatus further comprises output means for outputting a signal corresponding to an area size of said specific zone based on said coordinates, said control means controlling opening of said iris in accordance with said signal corresponding to the area size and the output of said weight applying means.

6. An apparatus as claimed in claim 4, characterized in that said average luminance calculating means comprise gating signal generating means for generating gating signals corresponding respectively to said zones based on said coordinates, accumulating means for accumulating sample values of the luminance information of the picture within said picturing area with respect to each of said zones in accordance with said gating signals, and dividing means for dividing accumulated values outputted from said accumulating means respectively by areas of said zones derived from said coordinates to thereby obtain the average luminance of the respective zones.

7. A method as claimed in claim 2 characterized in that said maximum weight is varied in accordance with an area size of said specific zone.

8. An apparatus as claimed in claim 5 characterized in that said average luminance calculating means comprise gating signal generating means for generating gate signals corresponding respectively to said zones based on said coordinates, accumulating means for accumulating sample values of the luminance information of the picture within said picturing area with respect to each of said zones in accordance with said gating signals, and dividing means for dividing accumulated values outputted from said accumulating means respectively by areas of said zones derived from said coordinates to thereby obtain the average luminance of the respective zones.

* * * * *